United States Patent Office 3,743,579
Patented July 3, 1973

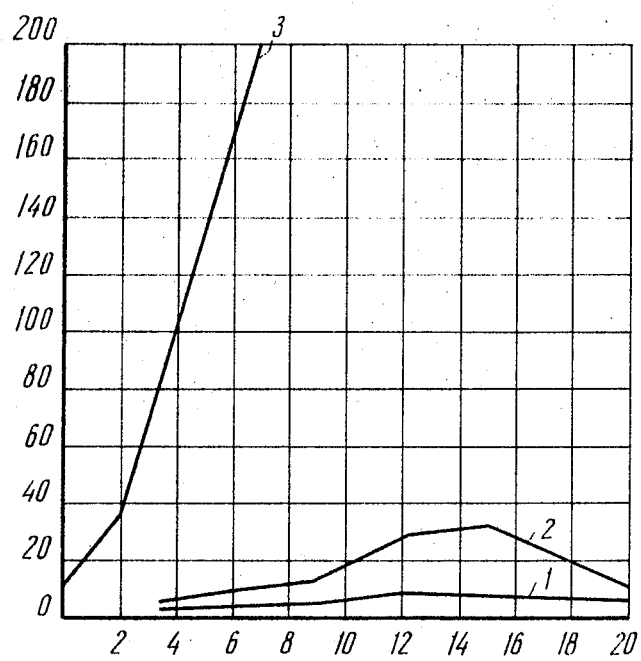

3,743,579
METHOD OF CULTIVATING LEISHMANIA
Georg Solomovich Zilberblat, Pushechnaya ul 7/5,
kv. 69, Moscow, U.S.S.R.
Continuation of application Ser. No. 616,934, Feb. 17,
1967. This application Oct. 26, 1970, Ser. No. 84,117
Int. Cl. C12b 1/14
U.S. Cl. 195—80          1 Claim

ABSTRACT OF THE DISCLOSURE

Leishmania are grown under submerged aerated conditions in a nutrient containing glucose and vitamin $B_1$.

---

This application is a streamlined continuation of Ser. No. 616,934 filed Feb. 17, 1967, and now abandoned.

This invention relates to methods of cultivating Leishmania in nutrient media containing glucose and vitamin $B_1$ with the use of inoculum.

Production of Leishmania is essential for making medicinal and biological preparations, viz vaccines, antigens, sera, antibiotics, etc.

Taxonomically, Leishmania belong to the type Protozoa, class Flagellata, subclass Zooflagellata, order Protomonadidae, family Trypanosomidae, genus Leishmania. The life cycle of Leishmania consists of two stages of development and is characterized by a change of "hosts." Leishmania in the vertebrates grow in the leishmanial stage, while in the invertebrates they occur in the leptomonad stages. Leishmania in the leptomonad stage are causes of the human diseases known as cutaneous and visceral leishmaniasis. Said diseases are widespread in many countries of Asia, Africa and South America. To prevent and treat leishmaniasis, use is made of biological preparations which are now produced in the laboratory but require considerable improvement.

Methods of cultivating Leishmania are known wherein the inoculum is planted in a thin layer of one- or two-phase nutrient media containing glucose and vitamin $B_1$ which are introduced along with other known ingredients when preparing the nutrient medium. Cultivation is carried out in conditions of natural aeration of the medium.

In a nutrient medium, Leishmania develop chiefly in the leptomonad stage identical with that passed in the invertebrate host. A method of cultivating Leishmania in the leptomonad stage has been described in the U.S.S.R. in the journal "Laboratornoye Delo," No. 6, p. 46, 1961. This method enables a maximum Leishmania concentration of 32 million per ml. to be obtained within 360 hrs. following the beginning of the development of the population in 5 ml. of culture.

The known methods are for laboratory use. They do not give exact characteristics of the process of Leishmania cultivation, i.e. age, pH and concentration of cells in the inoculum; volume of the inoculum to be sown in proportion to the total volume of the nutrient medium; pH and Leishmania concentration in the freshly inoculated culture, and other values. In these methods, the preparation of the nutrient media involves partial destruction of some ingredients, e.g. glucose and vitamin $B_1$. Thus, fractional sterilization causes decomposition of glucose to acid half-products unfit for consumption by microorganisms. As a result, the buffer capacity of the medium changes which often leads to a shift of the pH value of the prepared medium from a slightly alkaline reaction of 7.2–7.4 required for Leishmania multiplication to a slightly acid reaction of 6.7–6.9. Introduction of vitamin $B_1$ into a slightly alkaline nutrient medium along with other ingredients is also unfavorable, as it leads to rapid destruction of the free vitamin long before inoculation and the onset of Leishmania development. The known technique does not provide for long-term preservation of prepared media, thus necessitating reproduction of media after short intervals of time. The process of cultivation in the known methods is lengthy, requiring 240 to 360 hrs. These methods provide only a low level of maximum Leishmania concentration, ranging from 30 to 40 million per ml. Moreover, Leishmania are cultivated mostly in small volumes of nutrient media, i.e. 1 to 5 ml., which is a limiting factor in large-scale production.

The primary object of the present invention is to provide a method of obtaining Leishmania in specified amounts in stabilized nutrient media.

The above object is accomplished by providing a method of cultivating Leishmania in nutrient media containing glucose and vitamin $B_1$ with the use of inoculum, whereain, according to the invention, glucose and vitamin $B_1$ are introduced into the nutrient medium before inoculation with Leishmania, and cultivaiton is carried out in submerged conditions, supplying the air increasing by from 1 to 6 volumes per hour per volume of culture. It is preferable to sterilize the nutrient medium (pH 7.6–7.8) by heating at 127° C. for 1–1.5 hrs. prior to the introduction of glucose and vitamin $B_1$. Glucose and vitamin $B_1$ are preferably added to the nutrient medium in the form of sterile solutions. The inoculum is used in the form of culture in the leptomonad stage from the phase of logarithmic growth to the phase of diminishing growth, at the age of 5–15 days, the pH value being not lower than 5.5 and the Leishmania concentration not less than 30 million per ml. The inoculum is preferably introduced into the nutrient medium in a volume constituting 5–20% of the volume of the medium so as to obtain a Leishmania concentration of 4 to 18 million per ml. in freshly inoculated culture. Leishmania cultivation is preferably carried out at 25–28° C.

The present invention provides a Leishmania concentration of 120–150 million per ml., which is 3–4 times as high as that obtained by the known method of cultivation. High concentrations are developed twice as fast as in the known method. Said concentrations are obtained in cultures 500–700 times as large in volume as those in the known method. Furthermore, the invention provides for harvesting from a one-phase liquid medium Leishmania cultures in the form of a homogeneous cell suspension free from admixtures of medium ingredients, thus eliminating the necessity of additional purification of the cell material in subsequent manipulations. Separate sterilization of the nutrient medium and glucose and vitamin $B_1$ solutions enables a 10–12 fold reduction in the time required for preparing nutrient media, reducing it to several hours. Separate storage of the nutrient medium and glucose and vitamin $B_1$ solutions insures maintenance for several months of specified concentrations and a high quality of said ingredients in a medium ready for inoculation which is used when required. The present method is applicable for cultivating Leishmania of the cutaneous and visceral types.

For a better understanding of the present invention by those skilled in the art, the following examples are given by way of illustration.

EXAMPLE 1

Leishmania in the leptomonad stage of development are cultivated in a 5-liter reactor in a two-phase peptoneyeast medium of the following composition (ingredients calculated for 1 liter of medium):

| | |
|---|---|
| DD-peptone _____ ml__ | 200 |
| Meat broth (0.5 kg. of beeg boiled in 1 l. of water) _____ ml__ | 200 |
| Distilled water _____ ml__ | 600 |
| Dry granulated blood _____ g__ | 20 |
| Na$_2$HPO$_4$.12H$_2$O _____ g__ | 3 |
| KH$_2$PO$_4$ _____ g__ | 0.5 |

The nutrient medium is prepared in the reactor. First, a hematin solution is prepared from dry granulated swine blood. For this purpose hematin is extracted from 100 g. of blood granules with alkaline water at a pH of 8.3–8.4. The hematin solution is sterilized by heating at 127° C. for 1.5 hrs. Broth containing phosphates is added to said solution and the pH adjusted to 7.6–7.8. The nutrient medium is sterilized by heating at 127° C. for 1.5 hrs. The medium is then cooled to 15–25° C. and divided into two portions. One portion is used for cultivating Leishmania. For this purpose solutions of 150 ml. of 34% sterile glucose and 5 ml. of 5% sterile vitamin B$_1$ are added to it and thereafter inoculation is carried out. The other, greater, portion is stored at the above temperature for use over a period of several months.

The inoculum used must be a culture containing not less than 97% Leishmania in the leptomonad stage of development (whereof the permissible amount of deformed cells shall not exceed 5%) and not more than 3% Leishmania in the le